United States Patent
Fiorenza

(10) Patent No.: US 12,024,620 B2
(45) Date of Patent: Jul. 2, 2024

(54) COMPOUND FOR BODY PLY SKIM

(71) Applicant: BRIDGESTONE EUROPE NV/SA [BE/BE], Zaventem (BE)

(72) Inventor: Paolo Fiorenza, Rome (IT)

(73) Assignee: Bridgestone Europe NV/SA [BE/BE], Zaventem (BE)

( * ) Notice: Subject to any disclaimer, the term of this patent is extended or adjusted under 35 U.S.C. 154(b) by 277 days.

(21) Appl. No.: 17/432,991

(22) PCT Filed: Mar. 19, 2020

(86) PCT No.: PCT/IB2020/052547
§ 371 (c)(1),
(2) Date: Aug. 23, 2021

(87) PCT Pub. No.: WO2020/188521
PCT Pub. Date: Sep. 24, 2020

(65) Prior Publication Data
US 2022/0169838 A1  Jun. 2, 2022

(30) Foreign Application Priority Data
Mar. 20, 2019  (IT) ........................ 102019000004047

(51) Int. Cl.
*C08L 19/00* (2006.01)
*B60C 1/00* (2006.01)
*B60C 5/14* (2006.01)
*C08L 71/03* (2006.01)

(52) U.S. Cl.
CPC .......... *C08L 19/006* (2013.01); *B60C 1/0008* (2013.01); *B60C 1/0041* (2013.01); *B60C 5/14* (2013.01); *C08L 71/03* (2013.01); *C08L 2205/03* (2013.01)

(58) Field of Classification Search
CPC .... C08L 19/006; C08L 71/03; C08L 2205/03; B60C 1/0008; B60C 1/0041; B60C 5/14
See application file for complete search history.

(56) References Cited

U.S. PATENT DOCUMENTS

| 4,624,989 A | 11/1986 | Berta |
| 10,844,219 B2 * | 11/2020 | Silicani ................... C08L 71/03 |
| 2008/0314491 A1 * | 12/2008 | Soeda ....................... B32B 7/12 |
| | | 156/123 |

FOREIGN PATENT DOCUMENTS

| CN | 104592593 A | 5/2015 |
| CN | 108148225 A | 6/2018 |
| WO | 2007070728 A2 | 6/2007 |
| WO | 2017162583 A1 | 9/2017 |

OTHER PUBLICATIONS

English machine translation of Notice of Reasons for Refusal mailed Sep. 13, 2022 in Japanese Patent Application 2021-552968.*
International Search Authority: International Search Report for corresponding International Patent Application No. PCT/IB2020/052547 dated Jul. 13, 2020, 4 pages.

* cited by examiner

*Primary Examiner* — Angela C Scott
(74) *Attorney, Agent, or Firm* — Patterson Intellectual Property Law, PC

(57) ABSTRACT

A rubber compound for body ply skim comprising: —a mix of rubber consisting of (i) Epoxidized Natural Rubber acting as polymer base with a cross-linkable unsaturated chain; (ii) Natural Rubber acting as polymer base with a cross-linkable unsaturated chain; (iii) Polyepihalohydrin rubber, —a filler material, and—a vulcanization system; The compound comprises: 70 to 90 phr of said Polyepihalohydrin rubber; 5 to 25 phr of said Epoxidized Natural Rubber (E-NR); and 5 to 25 phr of said Natural Rubber (NR); the phr ratio between E-NR and NR ranging from 0.2 to 5.0.

11 Claims, No Drawings

COMPOUND FOR BODY PLY SKIM

The invention relates to a compound for body ply skim having impermeability features that are such as to ensure a significant reduction in the thickness of the innerliner layer or even a total elimination thereof.

Hereinafter the term innerliner layer indicates a rubber inner layer, which, as it is substantially impermeable to air, is used in tubeless tires in order to make sure that the air inside the carcass remains under pressure.

Generally speaking, the compounds used to manufacture the innerliner are obtained with a rubber matrix deriving from an halogenated isobutylene/isoprene copolymer.

As it is known, in the tire industry there is a much felt need to reduce the thickness of the innerliner, thought without jeopardizing its performances in terms of impermeability. Indeed, a smaller thickness of the innerliner layer necessarily implies a smaller quantity of material used, with evident advantages resulting therefrom both in terms of productivity and in terms of smaller weight of the tire, with positive effects on the total energy consumption of the vehicle and on the rolling resistance.

The object of the invention is to provide a solution capable of significantly reducing the thickness of the innerliner layer or even of completely eliminating it, thus obtaining the aforesaid advantages in terms of rolling resistance and in terms of productivity.

In the production of tires, in order to meet the required resistance and durability standards, manufacturers use reinforcing plies made of a thermoplastic material (such as, for example, nylon, rayon, polyester, aramid). The rubber covering the plies is commonly known as "body ply skim". As a person skilled in the art knows, one of the features to be fulfilled by the body ply skim compound concerns the high adhesive power towards the plies. Indeed, a low adhesion of the body ply skim to the ply would necessarily lead to a short durability of the tire.

Another requirement to be necessarily met by the body ply skim relates to its strength. Indeed, the strength and, hence, the integrity of the body ply skim directly affect the durability of the tire.

The reinforcing plies are usually used as reinforcement material in the carcass and the body ply skim of the body plies generally is in direct contact with the innerliner layer.

The Applicant surprisingly found out that, by properly changing the body ply skim compound, the latter can gain ideal features in term of permeability to the air, without jeopardizing its mechanical features and, hence, the durability of the tire. In this way, the thickness of the innerliner layer can be significantly reduced or even completely eliminated, as the oxygen impermeability action is totally or partly carried out by the body ply skim.

The subject-matter of the invention is a rubber compound for body ply skim comprising:

A mix of rubber consisting of (i) Epoxidized Natural Rubber acting as polymer base with a cross-linkable unsaturated chain; (ii) Natural Rubber acting as polymer base with a cross-linkable unsaturated chain; (iii) Polyepihalohydrin rubber,
a filler material, and
a vulcanization system;
said compound being characterized in that it comprises: 70 to 90 phr of said Polyepihalohydrin rubber; 5 to 25 phr of said Epoxidized Natural Rubber (E-NR); and 5 to 25 of phr said Natural Rubber (NR); the phr ratio between E-NR and NR ranging from 0.2 to 5.0.

The quantities are defined in phr, namely in parts per 100 parts of rubber, wherein the term rubber indicates the whole formed by Polyepihalohydrin, E-NR and NR.

Hereinafter the term vulcanization system indicates an assembly of ingredients comprising at least Sulfur and accelerator agents which, in the preparation of the compound, are added in a final mixing step and fulfil the aim of supporting the vulcanization of the polymer base once the compound is subjected to a curing temperature.

Hereinafter the term "polymer base with a cross-linkable unsaturated chain" identifies any natural or synthetic non-cross-linked polymer capable of taking on all the chemical-physical and mechanical features which are typically assumed by elastomers following a cross-linking (vulcanization) with Sulfur-based systems.

Preferably, the phr ratio between E-NR and NR ranging from 1.0 to 3.0.

Said Polyepihalohydrin rubber preferably is a rubber deriving from the homopolymer of Epichlorohydrin or from the Epichlorohydrin/Glycidyl-allyl ether copolymer or from the Epichlorohydrin/Ethylene oxide copolymer or from the Epichlorohydrin/Ethylene oxide/Glycidyl-allyl ether terpolymer.

The rubber compound according to the invention preferably comprises 0.0 to 40.0 phr of an inert material with a laminated structure.

Said inert material with a laminated structure preferably has a diameter ranging from 0.2 to 2 mm and an aspect ratio ranging from 5 to 30, preferably from 8 to 20.

Said inert material with a laminated structure is preferably comprised in the group consisting of Kaolin, Clay, Mica, Feldspar, Silica, Graphite, Bentonite, and Alumina.

A further subject-matter of the invention is a body ply skim portion manufactured with the compound according to the invention.

A further subject-matter of the invention is a tire comprising a body ply skim portion manufactured with the compound according to the invention.

The examples below serve a mere explanatory and non-limiting purpose, for a better understanding of the invention.

EXAMPLES

Eight compounds were produced, four of them being comparison compounds (Comp.1-4) and four of them being compounds according to the invention (A-D).

The four comparison compounds (Comp.1-4) can be divided into: a first comparison compound (Comp.1) representing a type of compound generally used for the preparation of innerliner layers; a second compound (Comp.2) representing a type of compound generally used for the preparation of body ply skims; a third and a fourth compound (Comp.3 and Comp.4) using Polyepihalohydrin, E-NR and an inert material with a laminated structure in quantities that are different from the ones set forth in this invention.

The four compounds according to the invention (A-D) differ from one another in the relative quantity of Polyepihalohydrin rubber, Epoxidized Natural Rubber and Natural Rubber, always within the ranges and under the conditions set forth in the invention, and in the presence or absence of the inert material with a laminated structure.

The comparison compounds Comp.1 and Comp.2 fulfil the aim of checking whether the body ply skim compounds of the invention have features of impermeability to Oxygen and of brittleness which can be compared with the ones of common innerliner layer and body ply skim layers, respectively; the comparison compounds Comp.3 and Comp.4 fulfil the aim of checking the relevance of the relative quantities among the Epoxidized natural rubber, the Polyepihalohydrin rubber and the inert material with a laminated structure.

Preparation of the Compounds

The compounds were produced with a standard procedure explained below, which is not relevant for the purposes of the invention.

($1^{st}$ Mixing Step)

The polymer bases, the reinforcing filler and the filler material (if present, also with the material with a laminated structure) were introduced into a mixer with tangential rotors (commonly known as Banbury) and with an inner volume ranging from 230 to 270 litres before the beginning of the mixing, thus reaching a filling factor ranging from 66 to 72%.

The mixer was operated at a speed ranging
from 40 to 60 revolutions/minute and the mixture resulting therefrom was removed after having reached a temperature ranging from 140 to 160° C.

($2^{nd}$ Mixing Step)

The vulcanization system was added to the mixture obtained from the preceding step, thus reaching a filling factor ranging from 63 to 67%.

The mixer was operated at a speed ranging from 20 to 40 revolutions/minute and the mixture resulting therefrom was removed after having reached a temperature ranging from 100 to 110° C.

Composition of the Compounds

Tables I and II show the phr compositions of the eight compounds described above.

TABLE I

|  | Comp. 1 | Comp. 2 | Comp. 3 | Comp. 4 |
| --- | --- | --- | --- | --- |
| SBR | — | 35.0 | — | — |
| Br-IIR | 80.0 | — | — | — |
| NR | 20.0 | 65.0 | — | — |
| E-NR | — | — | 65.0 | 35.0 |
| Polyepihalohydrin rubber | — | — | 35.0 | 65.0 |
| CB | 50.0 | 40.0 | 40.0 | 40.0 |
| CaCO3 | 40.0 | — | — | — |
| Laminated clay | — | — | 50.0 | 50.0 |
| Sulfur | 1.0 | 2.0 | 2.0 | 2.0 |
| MBTS | 1.5 | 0.2 | 0.2 | 0.2 |
| TBBS | — | 0.8 | 0.8 | 0.8 |

TABLE II

|  | A | B | C | D |
| --- | --- | --- | --- | --- |
| NR | 15.0 | 5.0 | 15.0 | 15.0 |
| E-NR | 15.0 | 10.0 | 15.0 | 15.0 |
| Polyepihalohydrin rubber | 70.0 | 85.0 | 70.0 | 70.0 |
| CB | 40.0 | 40.0 | 40.0 | 40.0 |
| Laminated clay | — | — | 10.0 | 20.0 |
| Sulfur | 2.0 | 2.0 | 2.0 | 2.0 |
| MBTS | 0.2 | 0.2 | 0.2 | 0.2 |
| TBBS | 0.8 | 0.8 | 0.8 | 0.8 |

SBR is a polymer base obtained by means of an emulsion or solution polymerization process with a styrene content ranging from 20 to 45% and an oil content ranging from 0 to 30%;

Br-IIR stands for Bromobutyl rubber.

NR stands for Natural Rubber, consisting of a polymer base made up of 1,4-cis Polyisoprene rubber of natural origin.

E-NR stands for Epoxidized Natural Rubber, having a degree of epoxidation amounting to 25%.

The Polyepihalohydrin rubber used is a rubber deriving from the Epichlorohydrin/Ethylene oxide/Glycidyl-allyl ether terpolymer, sold with the name T3000 by the company ZEON.

CB stands for carbon black belonging to the N6 class.

The laminated Clay used is a mineral filler produced and sold by BASF under the name ASP® NC X-1.

MBTS stands for Mercaptobenzothiazol-disulfide used as vulcanization accelerator.

TBBS stands for N-tert-butyl-2-benzothiazyl sulfenamide used as vulcanization accelerator.

Results of the Lab Tests

The compounds described above were used to produce respective samples, which were subjected to assessment tests in order to check the properties in terms of brittleness and in terms of impermeability to Oxygen.

In addition, the samples were subject to ply to rubber adhesion test in order to verify if the solution of the invention affects this property.

The Oxygen impermeability test was carried out on materials with a thickness of 0.7 mm and using a conventional apparatus, such as MOCON® OX-TRAN® (model 2/61). The values were measured at a temperature of 25° C.

The brittleness test was carried out according to ISO-812.

The adhesion of the compounds to the reinforcing ply was estimated as percentage of ply still covered with rubber after the separation of the two parts of the ply-rubber assembly through application of a load. The ply used in the text is made of PET.

For an easier interpretation of the results obtained, in Tables III and IV the values are expressed in a form indexed to the results of the comparison compound generally used for the production of an innerliner layer (Comp.1).

As to the brittleness and Oxygen impermeability values shown in Tables III and IV, it should be pointed out that the lower the value shown therein, the better the feature.

The ply-rubber adhesion value of the comparison compound Comp.1 is not shown in the table as said compound, being used for an innerliner layer and not for a body ply skim layer, does not have this feature.

TABLE III

|  | Comp. 1 | Comp. 2 | Comp. 3 | Comp. 4 |
| --- | --- | --- | --- | --- |
| Brittleness | 100 | 40 | 194 | 261 |
| Oxygen impermeability | 100 | 720 | 130 | 108 |
| Ply-rubber adhesion | — | 55 | 100 | 100 |

TABLE IV

|  | A | B | C | D |
| --- | --- | --- | --- | --- |
| Brittleness | 96 | 114 | 126 | 156 |
| Oxygen impermeability | 180 | 140 | 120 | 107 |
| Ply-rubber adhesion | 100 | 100 | 100 | 100 |

Based on the data shown in tables III and IV, the compounds according to the invention feature a better compromise between the Oxygen impermeability values and the brittleness values.

The values of the compounds according to the invention C and D prove how the presence of the inert material with a laminated structure can further improve the performances of the compounds in terms of impermeability, without jeopardizing the mechanical features (brittleness).

The values concerning the body ply skim show above, ensuring an advantageous combination of brittleness and impermeability, are such as to allow the thickness of the innerliner layer to be significantly reduced.

By so doing, the thickness of the innerliner layer can be remarkably reduced, ensuring, anyway, both the necessary impermeability to Oxygen, so that the latter does not reach the other parts of the tire, thus causing the known degradation phenomena thereof, and the necessary strength, so as not to jeopardize the durability of the tire.

The values of Table III concerning the comparison compounds Comp.3 and Comp.4 prove how the sole combination of Epoxidized rubber and Polyepihalohydrin rubber, even in the presence of the inert material with a laminated structure, cannot ensure the advantages of the compounds according to the invention, if the conditions imposed by the invention are not observed.

Finally, a further advantage of the invention lies in the fact said Polyepihalohydrin rubber can be obtained from renewable sources. As a matter of fact, processes were recently conceived, which are capable of producing Epichlorohydrin from Glycerol of natural origin. Therefore, by so doing, manufacturers will have the chance to produce body ply skim portions with a significantly lower environmental impact than the ones of the prior art.

In conclusion, from the data shown in table IV is clear that the solution of the present invention does not worsens ply-rubber adhesion.

The invention claimed is:

1. A rubber compound for a body ply skim comprising:
   a mixture of rubber consisting of:
      epoxidized natural rubber (E-NR) acting as polymer base with a crosslinkable unsaturated chain,
      natural rubber (NR) acting as polymer base with a cross-linkable unsaturated chain, and
      polyepihalohydrin rubber;
   a filler material;
   a vulcanization system; and
   wherein the compound comprises 70 phr to 90 phr of the polyepihalohydrin rubber, 5 phr to 25 phr of the E-NR, and 5 phr to 25 phr of the NR, with a phr ratio between the E-NR and the NR ranging from 0.2 to 5.0.

2. The rubber compound of claim 1, wherein the phr ratio between the E-NR and the NR ranges from 1.0 to 3.0.

3. The rubber compound of claim 1, wherein the polyepihalohydrin rubber comprises a rubber deriving from a homopolymer of epichlorohydrin, an epichlorohydrin/glycidyl-allyl ether copolymer, an epichlorohydrin/ethylene-oxide copolymer, or an epichlorohydrin/ethylene-oxide/glycidyl-allyl-ether terpolymer.

4. The rubber compound of claim 1, further comprising 0 phr to 40 phr of an inert material with a laminated structure.

5. The rubber compound of claim 4, wherein the inert material with the laminated structure has a diameter ranging from 0.2 mm to 2 mm and an aspect ratio ranging from 5 to 30.

6. The rubber compound of claim 5, wherein the inert material with the laminated structure has an aspect ratio ranging from 8 to 20.

7. The rubber compound of claim 4, wherein the inert material with the laminated structure includes at least one of kaolin, clay, mica, feldspar, silica, graphite, bentonite, or alumina.

8. The rubber compound of claim 1, wherein the vulcanization system comprises sulfur and one or more accelerator agents.

9. The rubber compound of claim 8, wherein the one or more accelerator agents include at least one of mercapto-benzothiazol-disulfide (MBTS) or n-tert-butyl-2-benzothiazyl sulfenamide (TBBS).

10. The rubber compound of claim 1, further comprising carbon black (CB).

11. A body ply skim comprising a rubber compound, the rubber compound including:
   a mixture of rubber consisting of:
      epoxidized natural rubber (E-NR) acting as a polymer base with a crosslinkable unsaturated chain,
      natural rubber (NR) acting as a polymer base with a cross-linkable unsaturated chain, and
      polyepihalohydrin rubber;
   a filler material; and
   a vulcanization system,
   wherein the compound comprises 70 phr to 90 phr of the polyepihalohydrin rubber, 5 phr to 25 phr of the E-NR, and 5 phr to 25 phr of the NR, with a phr ratio between the E-NR and the NR ranging from 0.2 to 5.0.

* * * * *